United States Patent [19]

Arai et al.

[11] Patent Number: 4,529,779

[45] Date of Patent: Jul. 16, 1985

[54] METHOD OF MAKING HEAT-RESISTANT POLYESTER WITH A GLYCIDYLISOCYANURIC ACID COMPOUND

[75] Inventors: Yoshihiro Arai, Joyo; Takumi Tanaka, Uji; Kenji Kamiyama, Osaka, all of Japan

[73] Assignee: Unitika Limited, Osaka, Japan

[21] Appl. No.: 644,281

[22] Filed: Aug. 27, 1984

[30] Foreign Application Priority Data

Oct. 7, 1983 [JP] Japan .................................. 58-188943

[51] Int. Cl.³ .............................................. C08G 63/76
[52] U.S. Cl. .................................... 525/438; 525/440; 528/289; 528/297
[58] Field of Search ................ 525/438, 440; 528/289, 528/297

[56] References Cited

U.S. PATENT DOCUMENTS

| | | | |
|---|---|---|---|
| 4,139,521 | 2/1979 | Lazarus et al. | 528/289 X |
| 4,459,390 | 7/1984 | Arai et al. | 525/438 |
| 4,459,392 | 7/1984 | Arai et al. | 525/438 |

*Primary Examiner*—Lucille M. Phynes
*Attorney, Agent, or Firm*—Richard A. Anderson

[57] ABSTRACT

This invention is a method of making heat-resistant polyester, the method being characterized by reacting the polyester consisting of aromatic dicarboxylic acid and the glycol component of 2–6 carbons with 0.3–5 weight % of the N-glycidylisocyanuric acid compound containing 1–2 N-glycidyl groups to reduce the amount of end carboxyl groups to less than 15 g equivalents per $10^6$ of the polymer.

2 Claims, No Drawings

METHOD OF MAKING HEAT-RESISTANT POLYESTER WITH A GLYCIDYLISOCYANURIC ACID COMPOUND

BACKGROUND OF THE INVENTION

This invention is related to the method of making heat-resistant polyester with reduced amount of the end carboxyl group (hereinafter this will be written as COOH).

Various methods of reducing the COOH of polyester have been proposed. Among them the method of reacting the polyester with epoxy compound is known as the typical example. However, the present inventors have examined this method and found out that the known epoxy compound has poor reactivity with the COOH of polyester, giving insufficient effect.

SUMMARY OF THE INVENTION

The present inventors have carried out studies to solve this problem and discovered that it is effective to react with the specific epoxy compound which is the N-glycidylisocyanuric acid compound containing 1-2 N-glycidyl groups; thus, this invention was achieved.

In other words, the key point of this invention is the method of making heat-resistant polyester, the method being characterized by reacting the polyester consisting of aromatic dicarboxylic acid and the glycol component having 2-6 carbons with 0.3-5 weight % of the N-glycidylisocyanuric acid compound containing 1-2 N-glycidyl groups to reduce the COOH to below 15 g equivalents per $10^6$ g of the polymer.

In this invention, polyester means the condensation polymer of aromatic dicarboxylic acid and the glycol having 2-6 carbons and there is no special restriction on the type. It can be a homopolymer or copolymer. As for the method of polycondensdation of the polyester, the known method can be used without a change.

The N-glycidylisocyanuric acid compound in this invention is given by the following general formula:

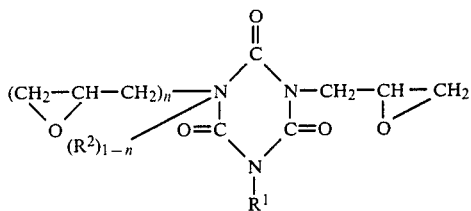

($R^1$, $R^2$ are hydrogen atom or monovalent organic group; n is 0 or 1).

As the specific examples of the N-glycidylisocyanuric acid compound, the following can be raised:
N-glycidylisocyanuric acid,
N-methyl-N'-glycidylisocyanuric acid,
N-ethyl-N'-glycidylisocyanuric acid,
N-phenyl-N'-glycidylisocyanuric acid,
N-propenyl-N'-glycidylisocyanuric acid,
N-propyl-N'-glycidylisocyanuric acid,
N,N'-diglycidylisocyanuric acid,
N,N'-dimethyl-N''-glycidylisocyanuric acid,
N,N'-diethyl-N''-glycidylisocyanuric acid,
N,N''-diphenyl-N''-glycidylisocyanuric acid,
N-methyl-N''-propenyl-N''-glycidylisocyanuric acid,
N,N'-dipropenyl-N''-glycidylisocyanuric acid,
N,N'-dipropyl-N''-glycidylisocyanuric acid,
N-propyl-N'-propenyl-N''-glycidylisocyanuric acid,
N,N'-dipropyl-N''-glycidylisocyanuric acid,
N-methyl-N',N''-diglycidylisocyanuric acid,
N-ethyl-N',N''-diglycidylisocyanuric acid,
N-phenyl-N',N''-diglycidylisocyanuric acid,
N-propenyl-N',N''-diglycidylisocyanuric acid and
N-propyl-N',N''-diglycidylisocyanuric acid.

These compounds can be synthesized by starting from the compound in which there is N-propenyl group in place of the N-glycidyl group and oxidizing the N-propenyl group to N-glycidyl group.

In other words, this method reacts the N-propenyl group of the starting substance with a peroxide, preferably with metachloroperbenzoic acid, to convert to N-glycidyl group.

Such N-glycidylisocyanuric acid compounds can be used alone or in combination of two or more.

The amount of addition of the N-glycidylisocyanuric acid compound which is used in this invention is 0.3-5 weight % with respect to the polyester. If it is too little, degree of blocking COOH is low; conversely, if it is too much, the reaction would proceed but undesirable problems occur such as the decomposition of unreacted N-glycidylisocyanuric acid compound and the abnormal decrease in the degree of polymerization of the polyester which makes the spinning impossible.

The reaction between the polyester and N-glycidyl isocyanuric acid compound is carried out by adding the N-glycidylisocyanuric acid compound after the intrinsic viscosity of the polyester reaches 0.50 at a temperature which is above the melting temperature of the polyester, taking more than three minutes. Here the intrinsic viscosity refers to the value measured at 20° C. using the mixed solvent of phenol/tetrachloroethane (1/1 weight ratio). At the time of reaction, it is naturally necessary to have the system filled with an inert gas atmosphere such as nitrogen gas or to have the system barred from the active gas such as oxygen which accelerates the decomposition of the polyester. Also, the reaction should be carried out under stirring. The N-glycidylisocyanuric acid compound may be added and mixed before the completion of the polycondensation of the polyester but one can also adopt the method in which it is added and mixed into the molten polyester after the completion of polymerization prior to the melt spinning or the method in which it is mixed with the powder polyester and then is melt spun to let it react. The reaction proceeds without a catalyst but one can also use a desirable catalyst.

Thus, the improvement of heat resistance is achieved by reacting the polyester with 0.3-5 weight % of N-glycidylisocyanuric acid compound to reduce the COOH to below 15 g equivalents per $10^6$ g of the polymer.

Also, in obtaining the polyester of this invention, one can of course add other additive to the polyester for other purposes.

The final form of the polyester in this invention can be fiber, film or any other shaped products.

The polyester with reduced COOH obtained by the method of this invention has very much improved heat stability, i.e., resistance to the hydrolysis or aminolysis at high temperature and this makes upgrading of performance in the conventional applications and optimization of the process possible and makes it possible to make new applications to the fields where application could not be made in the past. Thus, the improvement of practical value is remarkable.

In the following, we explain the invention more specifically by use of example of application.

DESCRIPTION OF PREFERRED EMBODIMENTS

Examples and Comparative Example

To the polyethyleneterephthalate chips of intrinsic viscosity 0.73 and a COOH of 24 g equivalents per $10^6$ g of the polymer as obtained by the common method from terephthalic acid and ethylene glycol, the epoxy compound listed in Table 1 were blended by the amount of addition shown in Table 1. Using an extruder-type melt spinning machine, spinning was carried out under the conditions of melt temperature 295° C., melt time about 10 minutes, spinning speed 500 m/min. Subsequently, the yarn was subjected to a two-stage drawing to a total draw ratio of 6.2 by use of the drawing machine comprising a 230° C. heated plate and 220° C. heated roller. Then the yarn was taken up at a speed of 200 m/min. to obtain the drawn yarn of 1500 d/192 f.

COOH and intrinsic viscosity of the drawn yarn are shown in Table 1.

The epoxy compounds of Examples 1–5, were synthesized by reacting, at room temperature, N,N',N''-tripropenylisocyanuric acid, N,N'-dimethyl-N''-propenylisocyanuric acid, N,N'-dipropenylisocyanuric acid, N-propyl-N',N''-dipropenylisocyanuric acid and metachloroperbenzoic acid and refining this through the separation by column chromatography. (The epoxy compounds of Examples 1 and 4 were obtained from the same raw materials by varying the amount of addition of the metachloroperbenzoic acid which was reacted, resulting in different epoxy compounds.)

In the table, it is seen that in the Examples 1–5 where the requirements of this invention were satisfied, addition of the N-glycidylisocyanuric acid compound reduced COOH in a good efficiency. In particular, by adding the isocyanuric acid compound having 2 N-glycidyl groups (Example of Application, 1 and 5,) better results were obtained with not only the reduction of COOH but also the increase of intrinsic viscosity.

When the amount of addition of N-glycidylisocyanuric acid compound was too little (Comparative Example 2), the effect was not sufficient; when it was too much (Comparative Example 3), intrinsic viscosity of the polyester dropped abnormally, making the spinning impossible.

Comparative Example 4 shows the known example; it is seen that the reactivity between the epoxy compound and polyester COOH was poor.

Comparative Example 5 shows the example in which a trifunctional epoxy compound was used. The polymer became three dimensional structure and gelling occurred, making spinning impossible.

TABLE 1

| Epoxy Compound | | Drawn Yarn | |
|---|---|---|---|
| Name of Compound | Amount Added, Wt. % | COOH g Equiv/ $10^6$ g | Intrinsic Viscosity |
| Example of Invention 1 N—propenyl-N'—N''—glycidylisocyanuric acid | 0.75 | 7 | 0.84 |
| Example of Invention 2 N,N'—dimethyl-N''—glycidylisocyanuric acid | 0.75 | 9 | 0.68 |
| Example of Invention 3 N—propenyl-N'—glycidylisocyanuric acid | 0.75 | 9 | 0.69 |
| Example of Invention 4 N,N'—dipropenyl-N''—glycidylisocyanuric acid | 0.75 | 7 | 0.68 |
| Example of Invention 5 N—propyl-N',N''—diglycidylisocyanuric acid | 0.75 | 8 | 0.83 |
| Comparative Example 1 | — | 29 | 0.70 |
| Comparative Example 2, N—propenyl-N',N''—diglycidylisocyanuric acid | 0.2 | 24 | 0.72 |
| Comparative Example 3, N—propenyl-N',N''—diglycidylisocyanuric acid | 6.0 | Spinning impossible | |
| Comparative Example 4, phenylglycidylether | 0.75 | 25 | 0.66 |
| Comparative Example 5, N,N',N''—triglycidylisocyanuric acid | 0.75 | Spinning impossible | |

We claim:

1. In a method of making a heat resistant polyester, said polyester consisting of an aromatic dicarboxylic acid and a glycol component having 2–6 carbon atoms, by reducing the carboxyl end groups in the polyester to below 15 g equivalents per $10^6$ g of polymer, the improvement comprising reacting said polyester with from about 0.3 to about 5 weight % of a N-glycidylisocyanuric acid compound containing a 1–2 N-glycidyl group.

2. The method of claim 1 wherein the N-glycidylisocyanuric acid compound is selected from the group consisting of
N-glycidylisocyanuric acid,
N-methyl-N'-glycidylisocyanuric acid,
N-ethyl-N'-glycidylisocyanuric acid,
N-phenyl-N'-glycidylisocyanuric acid,
N-propenyl-N'-glycidylisocyanuric acid,
N-propyl-N'-glycidylisocyanuric acid,
N,N'-diglycidylisocyanuric acid,
N,N'-dimethyl-N''-glycidylisocyanuric acid,
N,N'-diethyl-N''-glycidylisocyanuric acid,
N,N''-diphenyl-N''-glycidylisocyanuric acid,
N-methyl-N'-propenyl-N''-glycidylisocyanuric acid,
N,N'-dipropenyl-N''-glycidylisocyanuric acid,
N,N'-dipropyl-N''-glycidylisocyanuric acid,
N-propyl-N'-propenyl-N''-glycidylisocyanuric acid,
N,N'-dipropyl-N''-glycidylisocyanuric acid,
N-methyl-N',N''-diglycidylisocyanuric acid,
N-ethyl-N',N''-diglycidylisocyanuric acid,
N-phenyl-N',N''-diglycidylisocyanuric acid,
N-propenyl-N',N''-diglycidylisocyanuric acid and
N-propyl-N',N''-diglycidylisocyanuric acid.

* * * * *